United States Patent Office 3,262,744
Patented July 26, 1966

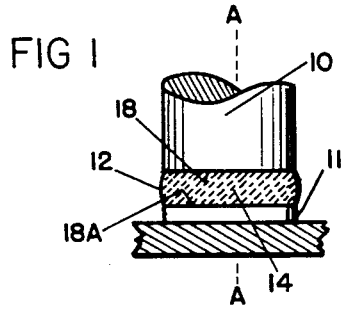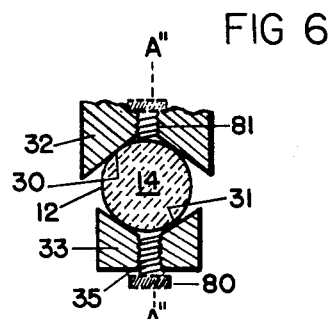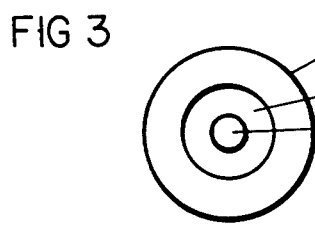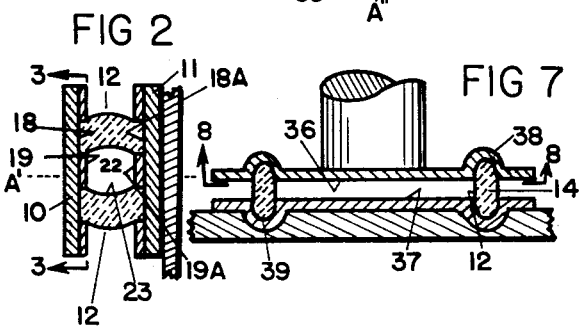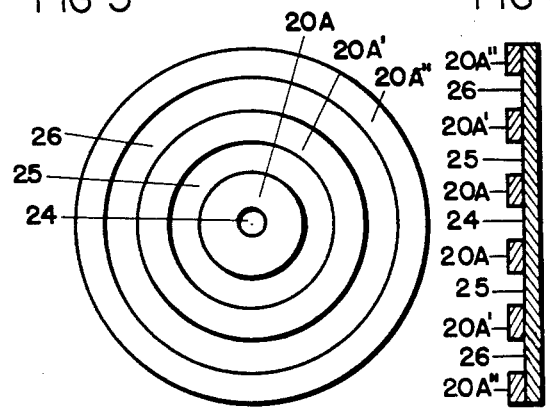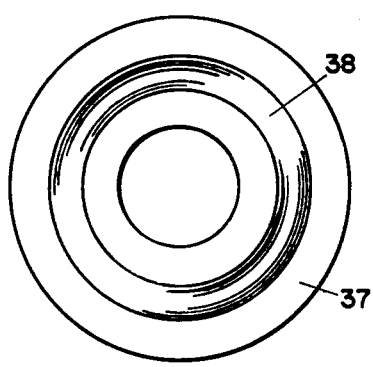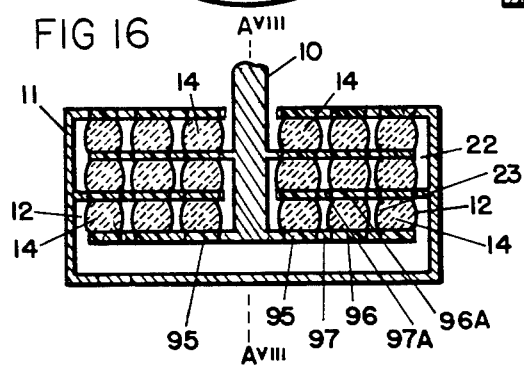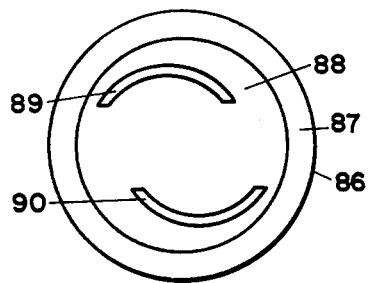
INVENTOR
JOHN F. THOMAS

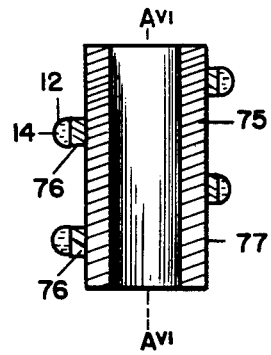
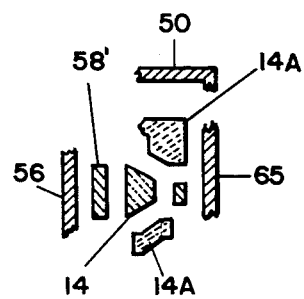
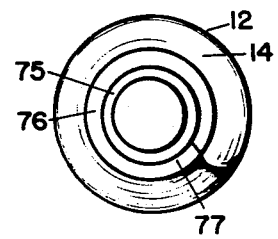
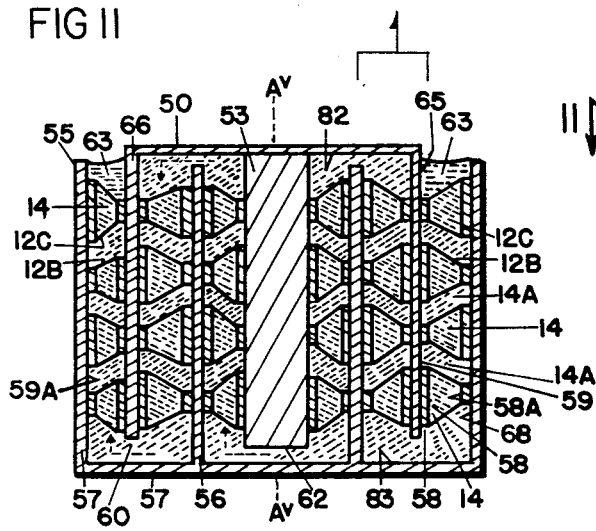
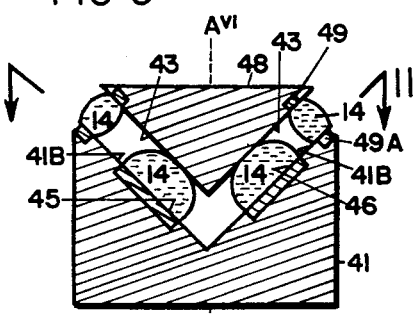
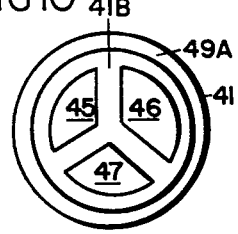
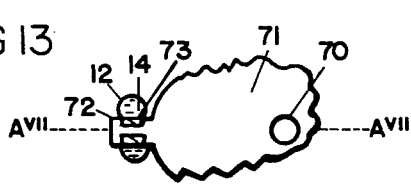

3,262,744
BEARINGS
John F. Thomas, 804 Cedarcroft Road, Baltimore, Md.
Filed Oct. 5, 1962, Ser. No. 229,287
4 Claims. (Cl. 308—240)

This invention relates to bearings and more specifically to bearings which are frictionless in the static sense, having no resistance to rotation when no relative motion exists between the bearing surfaces.

Previous attempts to attain frictionless bearings have consisted of various methods. In the use of dither one bearing surface is kept in nearly continuous motion with respect to the other to maintain a film of lubricant between the bearing surfaces. This requires a drive mechanism and is only partially effective. Another method is to pressurize the lubricant between the bearing surfaces. This requires special equipment and cannot be used in small spaces as in meters and watches. Magnetic force has been used but is subject to demagnetization by surge currents and is limited in strength.

This invention solves the problem of static bearing-friction by supporting the load on the force of surface tension in a fluid. As a feature whereby the objects of this invention are achieved the relatively weak forces of surface tension are multiplied to provide high hydrostatic stress at the bearing surfaces. It is therefore an object of this invention to provide a force for supporting load that is much greater than the force in the surface tension of the fluid. It is also a feature of this invention to multiply the force at the bearing surface by limiting the exposed fluid surface length between the bearing surfaces. It is therefore an object of this invention to provide a surface tension bearing having adjustable spacing of the liquid surface. In the various uses of bearings, linear motion is common between bearing surfaces. It is therefore an object of this invention to provide a surface tension bearing of linear form. A problem also solved by this invention occurs in the linear sliding action between gear teeth. It is therefore an object of this invention to provide a frictionless contact between gear teeth, as applied to various types of gears.

An incidental effect in surface tension bearings comes from the resilience of the fluid surface whereby energy may be stored in a stretched fluid surface to be used as a restoring force for such uses as the spring force in a meter or other instrument, where restoring force is used in oscillatory motion in conservative systems.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Referring to the drawings:

FIGURE 1 is an elevation of a thrust bearing made in accordance with the invention.

FIGURE 2 is an elevation of a surface tension bearing having an annular wetted surface.

FIGURE 3 is a sectional view taken along the line 3—3 of FIG. 2.

FIGURE 4 is a sectional view perpendicular to the axis of a multiannular thrust bearing.

FIGURE 5 is plan view of the bearing surface of FIGURE 5.

FIGURE 6 is a sectional view of a surface tension bearing having conically shaped bearing surfaces and a non-wetting fluid.

FIGURE 7 is a sectional view perpendicular to the axis of a surface tension bearing having a loaded fluid element of annular shape.

FIGURE 8 is a view of the bearing surface of FIGURE 7.

FIGURE 9 is a sectional view perpendicular to the axis of a surface tension bearing of segmented wetted area.

FIGURE 10 is a view of a surface from FIGURE 9 showing segmented wetted area and surrounding wetted annulus.

FIGURE 11 is an axial section of a multicylindrical surface tension bearing.

FIGURE 12 is a view of a spiral wetted area surrounded by a wetted annulus on a bearing surface.

FIGURE 13 is a sectional view of a gear section having tooth faces of fluid surface.

FIGURE 14 is a sectional view of worm gear having fluid facing.

FIGURE 15 is an end view of the gear of FIGURE 14.

FIGURE 16 is an axial section of a bearing having vertically stacked arrangement of relatively rotatable annuli.

Referring to FIGURE 1, a bearing having two coaxially disposed cylinder elements 10 and 11 is shown, said elements having facing surfaces 18, 18A wetted by a liquid 14. Element 10 is movable relative to element 11. Liquid 14 is confined to the facing surfaces of elements 10, 11 by attraction of the surface 12 of liquid 14 for the material composing the facing surfaces 18, 18A of elements 10, 11. This attractive force is known as interfacial tension. A force exists in liquid surface 12 tending to contract the free liquid surface 12 in all directions tangent to an element of its surface. This force is known as surface tension. When surface 12 is curved away from the central axis A—A of FIGURE 1, a positive hydrostatic pressure exists within the volume of liquid 14 for supporting load. Since hydrostatic pressure is known to act at right angles on an element of surface which confines it, force is exerted against surfaces 18, 18A upwardly in a direction parallel to the cylindrical axis A—A. Conversely, when free liquid surface 12 is curved inward, toward the axis A—A a negative pressure exists within the volume of liquid 14 and downward pressure is exerted on surface 18. Also a force perpendicular to central axis A—A is resisted by tension in the free surface 12.

In FIGURE 2 and FIGURE 3 are shown a bearing similar to the bearing of FIGURE 1 except that non-wetted areas 19, 19A are provided surrounded by the wetted surfaces 18, 18A. Thus the wetted surfaces of FIGURES 2 and 3 are of annular shape instead of circular. The bearing area in FIGURE 3 is representative of the shape of the facing bearing areas in FIGURE 2. The purpose of non-wetted areas of 19, 19A is to provide a second free fluid surface 23 for the purpose of increasing the strength of the bearing. Thus, instead of a single surface between the surfaces 18, 18A two fluid surfaces 12 and 23 now connect the wetted annular surfaces 18, 18A. For further increase in load capacity the volume 22 inclosed between non-wetted areas 19, 19A may be filled with a second liquid relatively immiscible with said first liquid 14. When load is applied urging element 10 toward element 11 surfaces 12 and 23 may curve outward away from axis A'—A' exerting hydrostatic force positively on volumes of liquids 14 and 22 by surface 12 and on liquid 22 by surface 23. Therefore, the hydrostatic pressure within volume of liquid 22 is the sum of that exerted by surface 23 and that exerted by surface 12. It is thence obvious that the hydrostatic pressure within the central volume inclosed by any number of concentric liquid annuli may be increased as the number of annuli is increased to provide arbitrarily high hydrostatic stress in a surface tension bearing. Also, the transverse strength of such a bearing increases with the number of liquid surfaces.

In FIGURE 4 is shown a bearing element having three wetted annuli 24, 25, 26 separated by non-wetted annuli 20A, 20A' and 20A" and FIGURE 5 is an end view of the bearing surface of FIGURE 4.

In FIGURE 6 a bearing is shown having non-wetted surfaces 30, 31 of conical shape rotationally symmetrical about axis A"—A". A volume of liquid 14 nearly fills the space between conically shaped end surfaces 30, 31 of concentric cylinders 32, 33. The materials of surfaces 30, 31 are not wetted by liquid 14. The surface tension in free surface 12 causes hydrostatic pressure to be exerted within the volume of liquid 14. Said hydrostatic pressure is capable of supporting downward pressure on cylinder 32 and, assuming cylinder 33 to be restrained immovably by a frame (not shown) cylinder 33 is rendered immovable against reacting downward force on surface 31 by liquid 14. A passage 35 is also shown for inserting liquid 14 and said passage 35 is closed by an adjustment screw 80. For instrument usage said adjustment screw may be an electrical conductor and a conductor 81 may be inserted in cylinder 32 and the liqued 14 may be mercury. Thus, a frictionless electrical connection may be provided to a moving coil element in meter usage.

In FIGURE 7 is shown a surface tension bearing consisting of two non-wetted annular grooves 38, 39 inclosing an annulus of liquid 14 for bearing load on bearing elements 36, 37. Element 36 is rotatable with respect to element 37, said elements held separated by hydrostatic pressure in liquid 14 caused by tension in its surface 12.

FIGURE 8 is a view of the grooved non-wetted surface 37.

A bearing having a combination of wetted and non-wetted facing surfaces is shown in FIGURES 9 and 10. Cylindrical bearing elements 48, 41 have ends of conical shape. One element 48 is non-wetted by a liquid 14 except for an annulus 49, and the conical end of element 41 is wetted by liquid 14 on pre-determined area 45, 46, 47, 49A. The cylindrical element 48 has one end 43 of conical shape and is disposed coaxially with the second element 41. The material of element 48 is not wetted by liquid 14, except for annulus 49, and makes non-wetting contact with liquid 14 as applied to areas 45, 46, 47. As seen in FIGURE 10 wetted areas 45, 46, and 47 are arranged in segments; separated by the non-wetted material 41B of element 41. A wetted annulus 49A surrounds said wetted areas.

In operation this bearing can withstand downward thrust, axial twist of element 48 with respect to element 41 and lateral thrust. The segmented areas provide stability against sidewise thrust because the inclination of the conical surfaces provides an increase of force on the side towards which bearing element 48 may be thrust and a reduction of pressure from the segment on the opposite side of the axis on which the separation of the facing conical elements is being reduced. This occurs because the increasing curvature of the surface of liquid being squeezed increases the hydrostatic pressure on the side of the cone towards which bearing element 48 is being pushed and reduces hydrostatic pressure in the segment on the side away from the direction of moving of element 48. The surface tension of annular liquid surfaces 12, 23 provides stability against upward force on element 48.

Concentric annuli may be arranged on the facing surfaces of concentric cylinders for the construction of very strong bearings for supporting loads on the surfaces of liquids. A bearing comprising annuli of liquids having surfaces connecting facing annuli on adjacent cylinders is shown in FIGURE 11. Bearing elements 50, 57 have mounted on surfaces 82, 83 concentric cylinders 53, 66 mounted on element 50 and cylinders 55, 56 mounted on element 57.

The bearing shown in FIGURE 11 is symmetrical about a vertical axis $A^V$—$A^V$. Rings 58, 58A of a material which is wetted by a liquid 14 are applied to faces 65, 68 of cylinders 66 and 53 respectively. A second liquid 14A fills the voids between the annuli comprised by the liquid 14 extending between wetted rings 58, 58A and connects in a wetting fashion to annular surfaces 59, 59A. At regular intervals on said concentric cylinders the combination of wetted annuli and wetting liquid 14 is repeated to obtain as many surfaces of wetting liquid between facing surfaces of cylinders as possible. The second liquid 14A filling the space between adjacent liquid annuli multiplies the hydrostatic stress on surfaces 62, 82. The hydrostatic stress is further increased by maintaining the radial thickness of the liquid annular surfaces at a minimum value. For purposes of sealing against evaporation a third liquid 63 of low volatility and immiscible with the high surface tension liquids 14 and 14A is applied on the open surface of the exposed annulus.

In operation bearing element 50 and attached cylinders 53, 66 are relatively rotatable with respect to bearing element 57 and attached cylinders 55, 56. Load applied downward on movable bearing element 50 compresses liquid 14A exerting force through successive liquid annuli and annuli surfaces and intervening second fluid through all stressed annuli and immiscible interannular fluids in a path traversed as shown by dotted arrow in FIGURE 11. Although the facing wetted annular surfaces may be of identical width said surfaces are shown of an unequal width such as 58, 58A to provide a force for maintaining the elements of bearing element 50 concentric with corresponding parts attached to bearing element 57. This centering action occurs because surfaces 12B and 12C have an increasing component of force in a radial direction at right angles to axis $A^V$—$A^V$ when cylinder 66 is moved away from cylinder 55 on one side of the bearing. The radial component of force in surfaces 12B and 12C increases while on the opposite side of the cylinder said radial component of force in surfaces 12B, 12C decreases and thus the total force is in a direction to return the cylinder 66 to a concentric position with respect to cylinder 55. This analysis is true for the other combinations of respective annuli and cylinders in this bearing. A tilting motion of the movable cylinders 53, 66 which causes radial displacement in one direction at its top and the opposite direction at its bottom will be resisted by a righting force by the liquid annuli as just described. This bearing configuration thus may be used singly for meter movements and similar applications.

As seen in FIGURES 1, 6, 9 hydrostatic pressure can be generated within a liquid volume whether the volume is confined between wetted surfaces, non-wetted surfaces or a combination of wetted and non-wetted surfaces for supporting movable load. It is apparent from FIGURES 9 and 10 that the liquid under pressure need not be of symmetrical shape about the axis of motion of the bearing surface. It is likewise apparent that a liquid under hydrostatic pressure when acting on a non-wetted surface may be of various shapes when confined to a non-wetted surface as shown in FIGURES 6 and 7. It is also apparent that the principle of this invention is not restricted to rotary motion since any small element of a rotational path may be considered relatively straight so that this type of bearing could be applied to linear bearing such as those used in the ways of lathes and milling machines in either segmented or linear form. It is also apparent that the action of the segments on the wetted surface of FIGURES 9 and 10 are little different from the face of a gear tooth concerning action of the force in the liquid surface. This is an example of one form of use of this invention in a partially linear path of motion.

In FIGURE 12 is shown a bearing surface 86 having a wetted annulus 87 on the outer extremity of its face. A non-wetted area 88 intervenes between said wetted annulus 87 and two wetted areas 89, 90 having the shape of identical sections of a spiral. Said bearing surface is disposed facing a surface of mirror image geometry and material. A high surface tension fluid surface connects the wetted surfaces. When a force is applied to rotate bearing element 86 with respect to its mirror image the liquid surfaces connecting wetted areas 89, 90 with the facing spirals, the fluid surface interconnecting spirals 89 and 90 with their mirror counterparts is stretched because of the spiral shape causing energy to be stored in the liquid surface which connects spirals 89, 90 to their non-rotating counterparts. Said stored energy since it opposed the rotational motion under the moving force according to established physical principles will cause bearing element 86 to return to its original position when said rotational force is removed, acting for all purposes as a spring. This principle of storing energy in a distorted liquid surface is useful in meter movements.

In FIGURE 13 is shown a wetted surface 12 applied to a limited area of wetted material as the face 73 of a tooth in a gear. A non-wetted material 72 covers the outer extremity of the gear tooth to confine liquid 14 to the working space of the gear tooth, said gear is symmetrical on two sides of the section line $A^{vii}$—$A^{vii}$, said gear has a web 71 connecting to rotational bearing 70 interconnecting said tooth with said gear axis.

Another type of application of surface tension force is shown in FIGURES 14 and 15 as a helical gear faced with a fluid under the pressure of surface tension. A cylinder 75 has wetted material 76 applied in a helix configuration on its outer surface 77. Said wetted material has liquid 14 wetting its outer surface 77 and is confined to said surface by the tension in fluid surface 12.

In operation, rotation of cylinder 75 and hence fluid surface 12 may be used to move a non-wetted solid or other fluid facing in contact with fluid surface 12 in a direction of the axis $A^{vi}$—$A^{vi}$ of the cylinder 75, which is also the axis of the liquid helix 14, 12.

In FIGURE 16 is shown a surface-tension bearing having vertically stacked arrays with respect to, and symmetric about, axis $A^{viii}$—$A^{viii}$, comprising relatively rotatable and radially disposed wetted and non-wetted annuli. Said arrays are mounted on relatively movable cylindrical bearing element 10, 11. A planar radial array is composed of coplanar wetted annuli radially separated by non-wetted annuli. Two such arrays are shown attached to movable bearing element 10 at their inner periphery. Said two planar arrays have mounted therebetween, in a facing position, a non-rotatable array of identical geometry and material and said non-rotatable arrays are rigidly attached at their outer periphery to non-rotatable bearing element 11. One such array consists of wetted annuli 95, 96 separated by a non-wetted annulus 97. Shaft 10 is also non-wetted forming effectively a non-wetted boundary for wetted annulus 95.

In operation, when there is no relative motion between bearing elements 10 and 11 and their attached arrays, element 10 is supported by liquid surfaces 12, jointly with the hydrostatic pressure in fluid 14. Other wetted annuli support the arrays attached to bearing element 10 and load applied through element 10 in a similar way. Although the second fluid 22 is shown between non-wetted elements 97 and 97A only, said second liquid 22 may fill any and all volume not occupied by the first liquid 14. When element 10 rotates under load, element 96 rotates relative to element 96A, the liquid surfaces 12, 23 continue to support the bearing and load. Rotation of rotatable arrays relative to non-rotatable arrays causes shearing of surface 12, 23. Kinetic theory of liquids shows that strength of surfaces 12, 23 is relatively unaffected by normal rotational speeds, load continues to be supported by said surfaces in conjunction with the resultant hydrostatic pressure within liquid 14.

I claim the following:

1. A bearing comprising a rotatable shaft having a bearing surface, a fixed surface facing said bearing surface, a first fluid within the space defined by said fixed surface and said bearing surface and wetting both surfaces, said fixed surface being bounded by a material which is not wetted by said first fluid, said bearing surface likewise being bounded by a material not wetted by said first fluid whereby said first fluid is confined to the space between said wetted fixed surface and said wetted bearing surface to form a first fluid annulus, load from said shaft to said fixed surface being transmitted through said first annulus and a second annulus of first fluid surrounding said first annulus and being bounded by said fixed and bearing surfaces having additional bounding surfaces non-wetted by said second annulus of fluid, load from said shaft to said fixed bearing surface also being transmitted through said second annulus.

2. A bearing as claimed in claim 1 with a second fluid immiscible with said first fluid and capable of wetting said materials not wetted by said first fluid, said second fluid being bounded by said first and second annuli of first fluid and by surfaces wetted by said second fluid on said shaft and on said fixed surface.

3. A bearing comprising a rotatable shaft having a first bearing surface, a first fixed surface facing said bearing surface, a first fluid within the space defined by said first fixed surface and said first bearing surface and wetting both surfaces, said first fixed surface being bounded by a material which is not wetted by said first fluid, said first bearing surface likewise being bounded by a material not wetted by said first fluid whereby said first fluid is confined to the space between said wetted first fixed surface and said wetted first bearing surface to form a first fluid annulus, and a second bearing surface on said shaft spaced from said bearing surface and composed of a material wetted by a second fluid, said second bearing surface being bounded by material not wetted by said fluid and a second fixed surface facing said second bearing surface and composed of material wetted by said second fluid and bounded by material non-wetted by said second fluid to form a second annulus of said second fluid spaced from said first annulus of first fluid, corresponding surfaces which are wetted and non-wetted by said second annulus of fluid.

4. A bearing comprising a shaft, means on said shaft supporting spaced surfaces concentric with said shaft, means supporting fixed surfaces concentric with said shaft and interdigitated with the surface of said shaft and surfaces thereon, a plurality of annuli on the spaced surfaces supported by said shaft, said annuli being of alternate materials, a plurality of annuli on said fixed surfaces in facing relationship to said first named annuli and of corresponding material, and first and second fluids immiscible with one another and each capable of wetting an alternate one of the materials of said annuli, said fluids alternating with one another so as each to wet bounding pairs of annuli.

(References on following page)

References Cited by the Examiner

UNITED STATES PATENTS

| | | | |
|---|---|---|---|
| 235,297 | 12/1880 | Roberts et al. | 308—9 |
| 1,310,038 | 7/1919 | Stewart | 308—159 |
| 1,544,488 | 6/1925 | Sherwood | 308—241 |
| 1,754,085 | 4/1930 | Faus | 308—159 |
| 2,059,856 | 11/1936 | Eastman et al. | 308—241 |
| 2,108,641 | 2/1938 | Blodgett | 91—68 |
| 2,366,196 | 1/1945 | Kappes | 58—140 |
| 2,449,771 | 9/1948 | Dolan | 308—241 |
| 2,980,473 | 4/1961 | Tanis | 308—240 |

FOREIGN PATENTS 141,098   7/1929   Switzerland.

DAVID J. WILLIAMOWSKY, *Primary Examiner.*

FRANK SUSKO, DON A. WAITE, *Examiners.*